United States Patent [19]

Takiyama et al.

[11] 4,081,591

[45] Mar. 28, 1978

[54] METHOD FOR STABILIZING UNSATURATED CYCLOACETAL RESIN

[75] Inventors: Eiichiro Takiyama, Kamakura; Toshiaki Sugimoto, Yokohama; Goichi Yamaguchi, Urawa; Susumu Nagao, Takasaki, all of Japan

[73] Assignees: Showa Highpolymer Co., Ltd.; Nippon Kayaku Kabushiki Kaisha, both of Tokyo, Japan

[21] Appl. No.: 694,999

[22] Filed: Jun. 11, 1976

[30] Foreign Application Priority Data

Jun. 11, 1975 Japan .................................. 50-69598

[51] Int. Cl.[2] .............................. C08F 2/00; C08F 4/00

[52] U.S. Cl. ................................ 526/217; 260/67 UC; 260/73 R; 526/236; 526/266

[58] Field of Search ........................ 526/217, 236, 266; 260/67 UC

[56] References Cited

U.S. PATENT DOCUMENTS

| | | | |
|---|---|---|---|
| 2,870,121 | 1/1959 | Kraft | 260/67 UC |
| 2,992,207 | 7/1961 | Guest | 260/67 UC |
| 3,933,857 | 1/1976 | Hanyuda et al. | 526/217 X |
| 3,993,663 | 11/1976 | Takiyama et al. | 526/266 X |

*Primary Examiner*—Lucille M. Phynes
*Attorney, Agent, or Firm*—Wenderoth, Lind & Ponack

[57] ABSTRACT

This invention relates to a method for stabilizing unsaturated cycloacetal resin produced by reacting (I) cycloacetal compound prepared by the condensation of polyhydric alcohol more than tri-hydric and unsaturated aldehyde, with (II) unsaturated alcohol having a radical-polymerizable unsaturated bond and an alcoholic hydroxyl group in the same molecule, and optionally further with one or more compounds selected from the group consisting of polyhydric alcohol, hydroxy polyether and hydroxy polyester, in the presence of acid catalyst, characterized by adding one or more compounds selected from the group consisting of ammonia, primary amine, secondary amine, tertiary amine, quaternary ammonium salt, hydrazine and its derivatives in an amount of 0.01 to 5 parts by weight per 100 parts by weight of the produced unsaturated cycloacetal resin during the reaction of producing the unsaturated cycloacetal resin and/or after the reaction and maintaining pH of the unsaturated cycloacetal resin (pH of a 50% methyl alcohol solution of the resin) at more than 4.

5 Claims, No Drawings

METHOD FOR STABILIZING UNSATURATED CYCLOACETAL RESIN

DETAILED EXPLANATION OF THE INVENTION

This invention relates to a method for stabilizing unsaturated cycloacetal resin useful for paint, laminate, bonding agent, lining material and film. More particularly, this invention relates to a method for stabilizing unsaturated cycloacetal resin produced by reacting (I) cycloacetal compound prepared by the condensation of polyhydric alcohol more than tri-hydric and unsaturated aldehyde (hereinafter simply referred to as "cycloacetal compound"), with (II) unsaturated alcohol having a radical-polymerizable unsaturated bond and an alcoholic hydroxyl group in the same molecule (hereinafter simply referred to as "unsaturated alcohol"), and optionally further with one or more compounds selected from the group consisting of polyhydric alcohol, hydroxy polyether and hydroxy polyester, in the presence of acid catalyst, characterized by adding one or more compounds selected from the group consisting of ammonia, primary amine, secondary amine, tertiary amine, quarternary ammonium salt, hydrazine and its derivatives in an amount of 0.01 to 5 parts by weight per 100 parts by weight of the produced unsaturated cycloacetal resin during the reaction of producing the unsaturated cycloacetal resin and/or after the reaction and maintaining pH of the unsaturated cycloacetal resin (ph of a 50% methyl alcohol solution of the resin) at more than 4.

Cycloacetal compound prepared by the condensation of polyhydric alcohol more than tri-hydric such as pentaerythritol and sorbitol with unsaturated aldehyde such as crotonaldehyde, acrolein and methacrolein is well-known as a spiroacetal resin. Among them, diallylidene pentaerythritol prepared by the condensation of pentaerythritol with acrolein and triallylidene sorbitol prepared by the condensation of sorbitol with acrolein are noteworthy since a double bond in the their structure has a special reactivity, and it is well-known that they react with active hydrogens of polyhydric alcohol, hydroxy polyether and hydroxy polyester to produce thermoplastic or thermosetting resin. However, these double bonds are not always satisfactory in radical-polymerizability. Consequently, this lessens their utility value.

We have studied that various properties of compounds having these cycloacetal groups, and found that they can be modified so as to have satisfactory radical polymerizability without damaging their essential features, by reacting double bonds of cgcloacetal compound with alcoholic hydroxyl groups of unsaturated alcohol (see Japanese Patent Publication No. 48-43353). One example is shown by the following reaction.

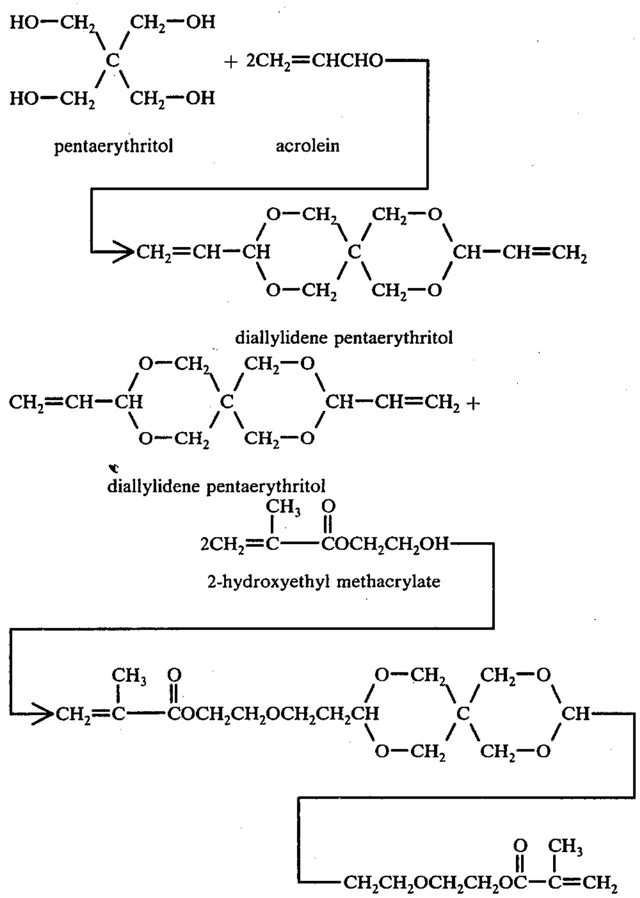

We have also found that a resin prepared by reacting cycloacetal compound, unsaturated alcohol and one or more compounds selected from the group consisting of polyhydric alcohol, hydroxy polyether and hydroxy polyester has various properties such as film-forming properties, flexibility and strength. The unsaturated cycloacetal resin thus obtained has excellent electric properties, film-forming properties, flexibility and compatibility with various other resins and therefore it is useful for paint, laminate, adhesive, lining material and film-forming material.

However, when unsaturated cycloacetal resin is prepared, unsaturated aldehyde is often generated during the reaction or after the reaction. The generation of the unsaturated aldehyde has been an obstacle in the practical use of unsaturated cycloacetal resin.

We have studied ways to remove this obstacle, but found that this obstacle could not be removed by ordinary means such as vacuum distillation and solvent extraction. Japanese Patent Publication No. 48-16992 disclosed a procedure to remove the generated unsaturated aldehyde and to improve curability of the resin by using keto-enol-form compound which can be reacted with the generated unsaturated aldehyde. However, this procedure could not achieve an adequate effect. As a result of our study, we have found that the generation of unsaturated aldehyde becomes greater and the effect of keto-enol-form compound becomes poorer as the pH value of the reaction system becomes lower or the reaction system becomes more acidic. Finally, we found that unsaturated aldehyde is not generated when a pH value of the reaction system is higher than 4.

However, adequate effects cannot always be achieved simply by adjusting the pH value of the reaction system to more than 4 by the addition of a basic compound. The effect is partly influenced by a type of reaction catalyst (e.g. Lewis acid). Suitable basic materials which can be used in accordance with this invention must have two functions, one of which is to raise the pH value of the reaction system and the other of which is to react with the generated free unsaturated aldehyde.

Examples of suitable basic materials which adjust the pH value of the reaction system and which simultaneously capture free unsaturated aldehyde include ammonia, primary amine, secondary amine, tertiary amine, quaternary ammonium salt, hydrazine and its derivatives. Primary amine, secondary amine, tertiary amine, quaternary ammonium salt, hydrazine and its derivatives which can be used in accordance with the present invention can be of any aliphatic, aromatic and cycloaliphatic compounds. Concrete examples of these compounds are listed below, but the present invention is not restricted to the use of these compounds.

Examples of primary amine include methyl amine, ethyl amine, n-propyl amine, n-butyl amine, n-amyl amine, n-hexyl amine, lauryl amine, ethylene diamine, trimethylene diamine, tetramethylene diamine, pentamethylene diamine, hexamethylene diamine, ethanol amine, allyl amine, aniline, diethylene triamine, o-phenylene diamine, isophorone diamine, m-xylylene diamine, isopropyl amine, isobutyl amine, secondary-butyl amine, secondary-amyl amine, secondary-hexyl amine, n-heptyl amine, 2-ethyl hexyl amine, propylene diamine, tetraethylene pentamine, p-tertiary-amyl aniline, o-toluidine, o-chloroaniline, cyclohexyl amine, isopropanol amine and the like.

Examples of secondary amine include dimethyl amine, diethyl amine, diisopropyl amine, n-dibutyl amine, diisobutyl amine, diamyl amine, dioctyl amine, methyl aniline, N-mono-n-butyl aniline, N-mono-amyl aniline, dicyclohexyl amine, diethanol amine, ethyl monoethanol amine, n-butyl monoethanol amine, diisopropanol amine and the like.

Examples of tertiary amine include trimethyl amine, triethyl amine, n-tributyl amine, triamyl amine, dimethyl aniline, diethyl aniline, N,N-di-n-butyl aniline, N,N-ditertiary-amyl aniline, diethyl benzyl amine, triethanol amine, diethyl ethanol amine, n-butyl diethanol amine, dimethyl ethanol amine, di-n-butyl ethanol amine, triisopropanol amine and the like.

Examples of quaternary ammonium salt include trimethyl benzyl ammonium chloride, lauryl pyridinium chloride, cetyl trimethyl ammonium chloride, phenyl trimethyl ammonium chloride and the like.

Examples of hydrazine and its derivatives include hydrazine, hydrazine hydrate, phenyl hydrazine and the like.

These basic materials can be satisfactorily used alone, and provide sufficient effects. However, the use of a combination of secondary amine with tertiary amine or a combination of secondary amine with quaternary ammonium salt is sometimes more effective on stability and curability, particularly in the case of unsaturated cycloacetal resin curable at room temperature.

These basic materials are used in such an amount as to make the pH value of a 50% methyl alcohol solution of unsaturated cycloacetal resin more than 4. Generally, these basic materials are used in an amount of 0.01 – 5 parts by weight, preferably 0.02 – 3 parts by weight per 100 parts by weight of unsaturated cycloacetal resin.

In addition to diallylidene pentaerythritol, other examples of cycloacetal compounds prepared by the condensation of polyhydric alcohol more than tri-hydric with unsaturated aldehyde, which can be used in the preparation of unsaturated cycloacetal resin in accordance with this invention, include dimethallylidene pentaerythritol, dicrotonylidene pentaerythritol, triallylidene sorbitol and the like. These cycloacetal compounds are synthesized by H. Schulz Method disclosed in "Angew. Chem." (Vol. 62, No. 5, pp. 105 – 118, 1950).

Examples of unsaturated alcohol having a radical polymerizable unsaturated bond and an alcoholic hydroxyl group in the same molecule, which can be used in the preparation of unsaturated cycloacetal resin in accordance with this invention, include hydroxyethyl (or hydroxypropyl) methacrylate, hydroxyethyl (or hydroxypropyl) acrylate, hydroxyethyl (or hydroxypropyl) crotonate, trimethylolpropane dimethacrylate, trimethylolpropane diacrylate, trimethylolethane dimethacrylate, trimethylolethane diacrylate, glycerine dimethacrylate, glycerine diacrylate, pentaerythritol triacrylate, pentaerythritol trimethacrylate, pentaerythritol dimethacrylate, pentaerythritol diacrylate, allyl alcohol, trimethylolpropane diallylether and the like. The above listed unsaturated alcohols have at least one alcoholic hydroxyl group and at least one radical polymerizable unsaturated bond such as methacrylyl, acrylyl, crotonyl and allyl groups. Specific examples of these unsaturated alcohols are 2-hydroxyethyl acrylate, 2-hydroxyethyl methacrylate, 2-hydroxypropyl acrylate and 2-hydroxypropyl methacrylate.

Examples of polyhydric alcohol, hydroxy polyether and hydroxy polyester which can be used in the preparation of unsaturated cycloacetal resin in accordance with the present invention are listed below. Polyhydric alcohol and hydroxy polyether can be any of aliphatic, aromatic and cycloaliphatic compounds. Polyhydric alcohol having an ether bond prepared by the dehydration condensation of more than two polyhydric alcohols can also be used. Examples of these compounds are: ethylene glycol, propylene glycol, pentamethylene glycol, neopentyl glycol, cyclohexane-1,4-dimethanol, hydrogenated bisphenol A, m-xylylene glycol, dibromoneopentyl glycol, butane diol, polybutadiene diol, 2,2-diethylpropane diol, diethylene glycol, triethylene glycol, polyethylene glycol (molecular weight = 200 - 500), dipropylene glycol, tripropylene glycol, polypropylene glycol (molecular weight = 200 - 500), glycerine, pentaerythritol, trimethylol ethane, trimethylol propane, a block polymer of polyethylene glycol and polypropylene glycol, polyoxyethylenesorbitan monostearate, 1,2,6-hexane triol, tris (2-hydroxyethyl) isocyanurate, xylitol, sorbitol, a glycol obtained by adding ethylene oxide and/or propylene oxide to bisphenols, tetrahydrofuran and the like.

In addition to these compounds, polysiloxane type polyhydric alcohol such as polysiloxane (3-hydroxy-2,2'-dimethylpropyl) ether can be used.

The hydroxy polyester can be either saturated or unsaturated ones. Generally, a prepolymer having a molecular weight of 500 - 5000 prepared by the reaction of polyhydric alcohol with polybasic acid is suitable. In the case of unsaturated hydroxy polyester, there is no special restriction on its composition. Any hydroxy polyester prepared not only by direct esterification but also by ester interchange or ring opening can be used.

Examples of hydroxy polyester include saturated hydroxy polyesters such as polyester polyol prepared from adipic acid and diethylene glycol, polyester polyol prepared from tetrahydrophthalic acid and trimethylol propane, polyester polyol prepared from phthalic acid, pentaerythritol and diethylene glycol and the like and unsaturated hydroxy polyesters such as polyester polyol prepared from phthalic acid, maleic acid and diethylene glycol and the like.

The ratio of amounts of cycloacetal compound, unsaturated alcohol, polyhydric alcohol, hydroxy polyether and hydroxy polyester used in the preparation of unsaturated cycloacetal resin varies depending on the intended use of the resin and is not restricted. However, it is generally preferable to use these compounds in the following equivalent ratio: 1 equivalent double bond of cycloacetal compound/ 0.1 - 2 equivalent hydroxyl group of unsaturated alcohol/ 0 - 1.9 equivalent active hydrogen of polyhydric alcohol, hydroxy polyether and hydroxy polyester.

Examples of catalyst which can be used in the preparation of unsaturated cycloacetal resin in accordance witn this invention include para-toluene sulfonic acid, Lewis acid, naphthalene sulfonic acid, benzene sulfonic acid and the like.

A polymerization inhibitor can be added to the reaction system in order to prevent undesired gelation. Examples of the polymerization inhibitor includes hydroquinone, hydroquinone monomethylether, benzoquinone, naphthoquinone, copper salt, phenothiazine and the like as disclosed in publicly known literature.

The reaction of the present invention can be carried out in the presence of polymerizable monomers such as styrene, but the polymerizable monomers are generally unnecessary, except for the case where the product has a very high viscosity and consequently there is a tendency of gelation. It is preferable to carry out the reaction in an inert gas stream since there is a possibility that the formed resin is colored and gelled in air.

A preferable embodiment of this invention is as follows. A mixture of cycloacetal compound and unsaturated alcohol or a mixture of cycloacetal compound, unsaturated alcohol and one or more compounds selected from the group consisting of polohydric alcohol, hydroxy polyether and hydroxy polyester is reacted at 60° - 120° C in the presence of acid catalyst. During the reaction and/or after the reaction, one or more compounds selected from the group consisting of ammonia, amines, hydrazine and its derivatives are added to the reaction system to make the pH value of the system more than 4. The product thus obtained is an unsaturated cycloacetal resin having no smell of unsaturated aldehyde.

This invention is further illustrated by the following Examples, but is not restricted thereto.

EXAMPLE 1

1200 g of hydroxy polyester having an acid value of 2.7 and a hydroxyl value of 67.4 (prepared by the reaction of diethylene glycol with adipic acid), 636 g of diallylidene pentaerythritol, 300 g of 2-hydroxyethyl methacrylate, 3 g of para-toluene sulfonic acid and 0.5 g of hydroquinone were placed in a three liter four-neck flask equipped with a stirrer, thermometer, cooling condenser and inlet tube for gas, and the resultant mixture was reacted in a carbon dioxide gas stream at 100° - 120° C for 10 hours. According to infra-red analysis, it was proved that substantially all of the hydroxyl groups disappeared. The pH value of this system (pH value of a solution prepared by dissolving 50 g of the formed resin in 50 g of methyl alcohol; the definition of this pH value is the same hereinafter) was 1.8 and an amount of free acrolein was 172 ppm, and the system had a strong stimulative smell. After adding 3 g of dimedone and 1.2 g of n-butyl amine to the system, the pH value of the system became 7.3 and the free acrolein and the stimulative smell completely disappeared. 900 g of styrene was added to the resin thus treated to prepare a light yellowish brown polyester-modified resinous solution having a viscosity of about 10 poises. 1.5 parts by weight of methyl ethyl ketone peroxide and 0.5 part by weight of cobalt naphthenate (6% Co) were then added to 100 parts by weight of the resinous solution prepared above, and the mixture began to gel in about 10 minutes and to cure while mildly generating heat. Mechanical properties of the resin thus cured were measured in accordance with JIS and the resin was proved to be useful as a casting resin. The mechanical properties of the resin were as follows:

| | |
|---|---|
| Tensile Strength | 2.9 - 3.4 kg/mm$^2$ |
| Bending Strength | It was impossible to measure since the test piece was not broken. |
| Charpy Impact Strength | 6 - 11 kg-cm/cm$^2$ |
| Degree of Elongation | 113 - 141 % |

EXAMPLE 2

848 g of diallylidene pentaerythritol, 270 g of butanediol-1,4, 3 g of para-toluene sulfonic acid and 0.5 g of hydroquinone were placed in a two liter four-neck flask as used in Example 1, and the mixture was reacted at 100°-110° C for 4 hours. 232 g of 2-hydroxyethyl acrylate was then added to the reaction mixture, and the resultant mixture was reacted for a further 4 hours. Consequently, more than 90% of free hydroxyl group disappeared. The reaction product thus obtained was a yellowish brown, viscous, syrupy material containing as a main component a compound having the following chemical formula:

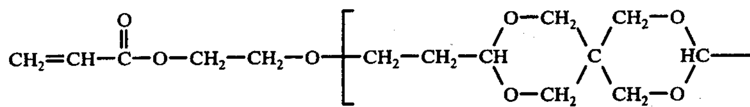

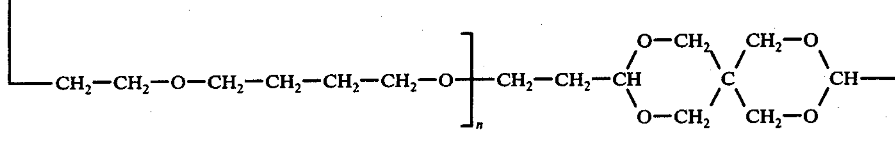

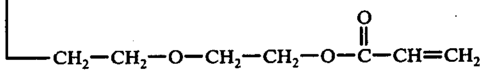

wherein $n$ represents 0 – 5, and an average value of $n$ is 3.

This product had a pH value of 1.1 and 131 ppm of free acrolein, and there was a very stimulative smell.

50 parts by weight of toluene, 30 parts by weight of butyl acetate and 0.6 part by weight of hydrazine hydrate were then added to 100 parts by weight of this product. After 24 hours from the addition, the pH value of the product became 6.7 and the amount of free acrolein was less than 2 ppm. This means that the free acrolein substantially disappeared.

1 part by weight of tertiary butyl perbenzoate and 0.2 part by weight of cobalt naphthenate (6% Co) were then added to the above prepared resin, and the resultant mixture was uniformly stirred to obtain a casting resinous solution. The casting resinous solution was then coated on a polished steel plate in such a manner as to obtain a coating having a thickness of 0.2 mm. The resin-coated steel plate was then backed at 120° C for 1 hour, and the resin was cured to an elastic state having a pencil hardness of 2H – 3H. According to an adhesion test, the resin coating was proved to have an excellent adhesive force.

EXAMPLE 3

350 g of triallylidene sorbitol, 300 g of 2-hydroxyethyl methacrylate, 104 g of neopentyl glycol, 2 g of para-toluene sulfonic acid and 0.3 g of hydroquinone were placed in a one liter four-neck flask equipped with a stirrer, thermometer, reflux condenser and inlet tube for gas, and the resultant mixture was reacted at 80° – 100° C for 8 hours. According to infra-red analysis, it was proved that substantially all of the free hydroxyl groups has disappeared. The amount of acrolein remaining was about 300 ppm, and there was strong stimulative smell. After adding 2 g of dimedone and 1.0 g of triethyl amine to the system, the pH value of the system became 6.9 and the amount of acrolein remaining became 3 ppm. The smell also became very weak.

The produce prepared-above was a dark reddish brown, solid-like, viscous material containing as a main component a compound having the following chemical formula:

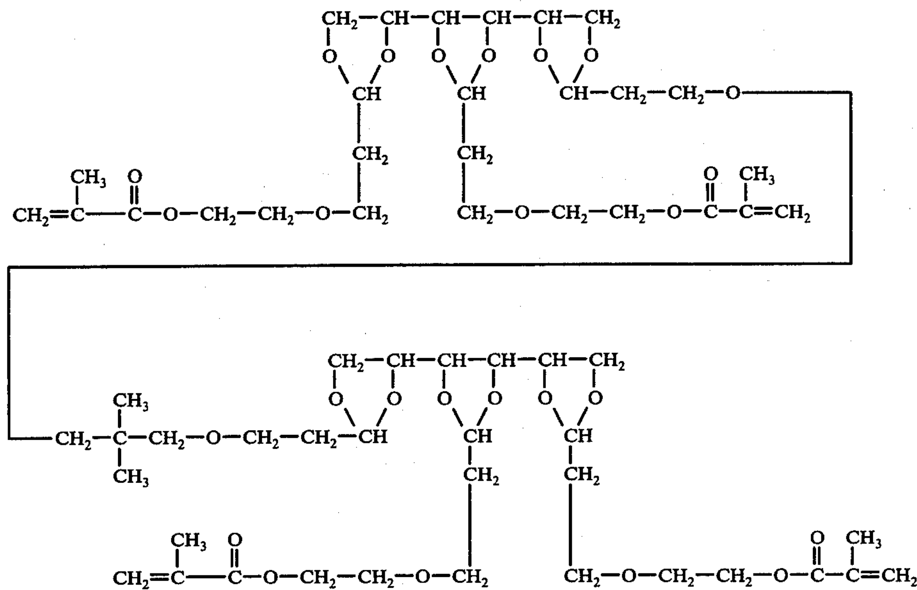

1.5 parts by weight of methyl ethyl ketone peroxide and 0.5 part by weight of cobalt naphthenate (6% Co) were added to 100 parts by weight of a resinous solution prepared by dissolving 100 parts by weight of the above prepared product in 40 parts by weight of styrene. The resultant mixture was then coated on a glass fiber mat (#450) in such a manner as to obtain a laminate having a thickness of 3 mm. Physical properties of the fibrous glass reinforced plastic (FRP) thus obtained were excellent and were as follows:

| | |
|---|---|
| Tensile Strength | 13.4 - 16.0 kg/mm$^2$ |
| Bending Strength | 20.1 - 26.8 kg/mm$^2$ |
| Charpy Impact Strength | 22.2 -0 31.4 kg-cm/cm$^2$ |
| Rockwell Hardness | M-105 |

The above prepared resin was laminate-molded into a bath shape using a glass mat by Hand Lay-up Method. The surface of the resin was completely cured without the addition of wax, and provided a very tough and hard laminate. The laminate thus prepared having the above mentioned excellent properties could not be obtained by using the conventional unsaturated polyester.

EXAMPLE 4

212 g of diallylidene pentaerythritol, 265 g of 2-hydroxyethyl methacrylate, 0.3 g of hydroquinone and 3 g of $\beta$ naphthalenesulfonic acid were placed in a one liter-four-neck flask as used in Example 3, and the resultant mixture was reacted at 90° - 100° C for 5 hours under a nitrogen stream. More than 90% of the free hydroxyl groups disappeared by this reaction. The pH value of this system was 2.2 and the amount of acrolein remaining was 72 ppm. The system had a strong stimulative smell due to the presence of the remaining acrolein. After adding 1.7 g of dibutyl amine to the system, the pH value of the system became 7.3, and the remaining acrolein completely disappeared. In order to check the change of an amount of the remaining acrolein by a lapse of time, the system containing dibutyl amine was heated to 40° C and allowed to stand for one month. After a lapse of one month, the amount of acrolein included in the system was measured at 40° C and was found to be 0.5 ppm. For the purpose of comparison, the same test was carried out with regard to the system not containing dibutyl amine, and as a result the amount of acrolein included in the system was found to be 329 ppm.

100 parts by weight of aluminum hydroxide, 2 parts by weight of cumene hydroperoxide and 1 part by weight of cobalt naphthenate mixed with 100 parts by weight of the above prepared resin, and the resultant mixture was cast into a plate having a thickness of 3 mm. The cast plate was subjected to a tracking test (IEC Method), and was proved to be excellent in tracking resistance. More than 600 drops of reagent was required to cause a tracking on the test sample at 600 volts.

EXAMPLE 5

350 g of diallylidene pentaerythritol, 191 g of 2-hydroxyethyl acrylate and 247 g of polypropylene glycol (molecular weight = about 300), 0.3 g of hydroquinone and 2.3 g of para-toluene sulfonic acid were placed in a one liter-four-neck flask as used in Example 3, and the resultant mixture was reacted at 90° - 100° C for 5 hours. Consequently, a reddish brown resin having a viscosity of about 50 poises was obtained. It was proved by analysis that more than 90% of the free hydroxyl groups had disappeared.

The pH value of this product was 2.1 and an amount of acrolein remaining was 65 ppm which provided a stimulative smell. The product thus obtained was divided into two parts. 1.1 g of trimethyl benzyl ammonium chloride was added to one part and 0.1 g of ammonia was added to the other part. Consequently, an amount of acrolein remaining in the product containing trimethyl benzyl ammonium chloride became 4 ppm and the pH value of the product became 6.8. On the other hand, an amount of acrolein remaining in the product containing ammonia became 1 ppm and the pH value of the product became 7.1.

EXAMPLE 6

The same procedure as in Example 4 was repeated, except that 1.7 g of dibutyl amine was replaced by 0.5 g of hydrazine. Consequently, the same results as in Example 4 were obtained.

EXAMPLE 7

The same procedure as in Example 4 was repeated, except that 1.7 of dibutyl amine was replaced by 1.3 g of diethyl amine. The same results as in Example 4 were obtained.

EXAMPLE 8

212 g of diallylidene pentaerythritol, 560 g of trimethylol propane dimethacrylate, 2.5 g of para-toluene sulfonic acid and 0.5 g of hydroquinone were placed in a one liter four-neck flask equipped with a stirrer, thermometer, condenser and inlet tube for gas, and the resultant mixture was reacted while stirring in a nitrogen stream at 80° C for 15 hours. According to infra-red analysis, it was proved that almost 90% of the hydroxyl groups had reacted to produce a resin having a low viscosity (2.5 poises at 25° C). The pH value of the product was 1.5 and the amount of free acrolein remaining was 198 ppm. A stimulative smell of the acrolein was very strong. After adding 0.6 g of diethyl amine and 0.7 g of triethyl amine to the product, the pH value of the product became 7.6 and the amount of acrolein remaining in the product became 0.5 ppm. Consequently, the stimulative smell of the acrolein substantially disappeared.

1 part by weight of benzoyl peroxide and 0.2 part by weight of dimethyl aniline was added to 100 parts by weight of the resin thus obtained and the resultant mixture was cured at room temperature thereby forming a very hard and transparent cured resin having excellent heat-resistance.

A resinous mixture of 100 parts by weight of the above prepared resin with 60 parts by weight of styrene could be cured at room temperature in the same manner as above.

A resinous mixture of 100 parts by weight of the above prepared resin with 20 parts by weight of methyl methacrylate could also be cured at room temperature in the same manner as above.

EXAMPLE 9

500 g of hydroxyl polyester having an acid value of 6 and a hydroxyl value of 269 (prepared by the reaction of trimethylol propane, neopentyl glycol and phthalic anhydride), 239.4 g of diallylidene pentaerythritol, 20.4 g of 2-hydroxypropyl acrylate, 1.5 g of hydroquinone and 2.4 g of paratoluene sulfonic acid were placed in a one liter-four-neck flask equipped with a stirrer, thermometer, condenser and inlet tube for gas, and the resultant mixture was reacted at 100° - 110° C for 4 hours. 86% of the hydroxyl groups had reacted by this reaction, but a strong stimulative smell of acrolein remained. After adding 0.6 g of diethyl amine to the system, the resultant mixture was reacted for a further 2 hours. At this stage of the reaction, 92% of hydroxyl groups were reacted and the pH value of the reaction system was 3.7 and the amount of free acrolein was 20 ppm. At the second stage, 0.7 g of triethyl amine was further added to the system, and consequently the pH value of the reaction system became 7.8 and the amount of free acrolein became less than 0.1 ppm. 340 g of styrene was added to the resin thus obtained to prepare a light yellowish brown resinous solution having a viscosity of 5.4 poises. 0.5 g of cobalt naphthenate (Co 6%) and 1.5 g of methyl ethyl ketone peroxide were then added to 100 g of the resinous solution. The resultant mixture started to gel within 20 minutes, and the temperature of the solution reached 139° C at the maximum. By this reaction, a hard and tough cured resin was obtained.

When the above prepared resinous solution was coated on a steel plate by a knife coater, the coated resin gelled in 31 minutes and dried to the touch in 78 minutes. After allowing to stand for 24 hours, the pencil hardness of the coated resin became 3 H. These properties prove that the above prepared resin is practical as a paint resin.

EXAMPLE 10

360 g of dicrotonylidene pentaerythritol, 398 g of 2-hydroxyethyl methacrylate, 3 g of para-toluene sulfonic acid and 0.7 g of hydroquinone were placed in a four-neck flask as used in Example 9, and the resultant mixture was reacted at 90° C for 7 hours. It was proved by infra-red analysis that more than 90% of the hydroxyl groups had disappeared. The pH value of the system was 1.1 and the amount of croton aldehyde remaining was 205 ppm which provided a strong smell of croton aldehyde. After adding 0.9 g of dibutyl amine and 0.7 g of trimethyl benzyl ammonium chloride to the system, the pH value of the system became 7.9 and the amount of free croton aldehyde became less than 0.2 ppm. Consequently, the stimulative smell of croton aldehyde completely disappeared.

What we claim is:

1. A method for stabilizing an unsaturated cycloacetal resin produced by reacting (I) a cycloacetal compound selected from the group consisting of diallylidene pentaerythritol, triallylidene sorbitol, dicrotonylidene pentaerthritol and dimethallylidene pentaerythritol with (II) an unsaturated alcohol selected from the group consisting of 2-hydroxyethyl acrylate, 2-unsaturated methacrylate, 2-hydroxypropyl acrylate and 2-hydroxypropyl methacrylate, said components (I) and (II) optionally being further reacted with one or more compounds selected from the group consisting of a polyhydric alcohol, a hydroxy polyether and a hydroxy polyester, in the presence of an acid catalyst, which method comprises adding a stabilizer selected from the group consisting of (a) a combination of a secondary amine and a tertiary amine and (b) a combination of a secondary amine and a quaternary ammonium salt to the reaction system, in an amount of 0.01 to 5 parts by weight per 100 parts by weight of the unsaturated cycloacetal resin, during the reaction of producing the unsaturated cycloacetal resin and/or after completion of the reaction, and maintaining the pH of the unsaturated cycloacetal resin at a value higher than 4, measured on the basis of a 50% methyl alcohol solution of the resin.

2. A method as claimed in claim 1, wherein said stabilizer is a combination of a secondary amine and a tertiary amine.

3. A method as claimed in claim 1, wherein said stabilizer is a combination of a secondary amine and a quaternary ammonium salt.

4. A method as claimed in claim 1, wherein said stabilizer is added to the reaction system in an amount of 0.02 to 3 parts by weight per 100 parts by weight of the unsaturated cycloacetal resin.

5. A method as claimed in claim 3, wherein said quaternary ammonium salt is trimethyl benzyl ammonium chloride, lauryl pyridinium chloride, cetyl trimethyl ammonium chloride or phenyl trimethyl ammonium chloride.

* * * * *